United States Patent
Vasavada et al.

(10) Patent No.: US 9,749,035 B2
(45) Date of Patent: Aug. 29, 2017

(54) APPARATUS AND METHOD FOR NETWORK LEVEL SYNCHRONIZATION IN MULTIPLE LOW EARTH ORBIT (LEO) SATELLITE COMMUNICATIONS SYSTEMS

(71) Applicant: Hughes Network Systems, LLC, Germantown, MD (US)

(72) Inventors: Yash Vasavada, Gaithersburg, MD (US); Channasandra Ravishankar, Germantown, MD (US); Deepak Arur, McLean, VA (US); Michael Parr, Del Mar, CA (US)

(73) Assignee: Hughes Network Systems, LLC, Germantown, MD (US)

( * ) Notice: Subject to any disclaimer, the term of this patent is extended or adjusted under 35 U.S.C. 154(b) by 98 days.

(21) Appl. No.: 14/663,442

(22) Filed: Mar. 19, 2015

(65) Prior Publication Data
US 2015/0270890 A1     Sep. 24, 2015

Related U.S. Application Data

(60) Provisional application No. 61/955,750, filed on Mar. 19, 2014.

(51) Int. Cl.
| | | |
|---|---|---|
| *H04W 4/00* | (2009.01) | |
| *H04B 7/185* | (2006.01) | |
| *H04W 56/00* | (2009.01) | |
| *H04B 7/195* | (2006.01) | |

(52) U.S. Cl.
CPC .......... *H04B 7/1851* (2013.01); *H04B 7/195* (2013.01); *H04W 56/00* (2013.01); *H04B 7/185* (2013.01)

(58) Field of Classification Search
CPC ...... H04B 7/185; H04B 7/1851; H04W 56/00
USPC ......................................................... 370/252
See application file for complete search history.

(56) References Cited

U.S. PATENT DOCUMENTS

| | | | | |
|---|---|---|---|---|
| 5,594,453 A | * | 1/1997 | Rodal | G01S 19/235 |
| | | | | 342/352 |
| 5,659,545 A | | 8/1997 | Sowles et al. | |
| 5,678,175 A | * | 10/1997 | Stuart | H04B 7/195 |
| | | | | 244/158.4 |
| 5,790,939 A | | 8/1998 | Malcolm et al. | |
| 5,798,732 A | * | 8/1998 | Eshenbach | G01S 19/243 |
| | | | | 342/352 |

(Continued)

OTHER PUBLICATIONS

PCT/US2015/021615 ISR & WO, Jun. 25, 2015.

*Primary Examiner* — Farah Faroul
(74) *Attorney, Agent, or Firm* — Potomac Technology Law, LLC

(57) ABSTRACT

A synchronization approach is provided that compensates for the large Doppler offset of the satellites in a LEO satellite system by exploiting the predictable and deterministic nature of the Doppler component, and thereby simplifies the delay and the Doppler domain uncertainty ranges that the physical layer receivers have to resolve. The compensation is based on the known ephemeris information of the LEO satellite and the known positions of the gateway (GW) and the user terminal (UT) on the ground. Utilizing the deterministic component of the LEO Doppler, the synchronization process continually tracks and compensates for the time-varying offsets between the GW and UT frame timing, frame numbering (FN), symbol timings, and Doppler-induced scaling of center frequency and the signal bandwidth.

18 Claims, 15 Drawing Sheets

(56) References Cited

U.S. PATENT DOCUMENTS

| | | | | |
|---|---|---|---|---|
| 5,844,521 A | * | 12/1998 | Stephens | H04B 7/1855 |
| | | | | 342/357.2 |
| 5,936,570 A | | 8/1999 | Ghazvinian et al. | |
| 5,943,606 A | | 8/1999 | Kremm et al. | |
| 6,094,162 A | * | 7/2000 | Sullivan | G01S 5/02 |
| | | | | 342/357.68 |
| 6,181,912 B1 | * | 1/2001 | Miller | H04B 7/2125 |
| | | | | 455/12.1 |
| 6,295,023 B1 | * | 9/2001 | Bloebaum | G01S 19/254 |
| | | | | 342/357.62 |
| 8,164,519 B1 | * | 4/2012 | Bedoya Martinez | G01S 19/24 |
| | | | | 342/357.69 |
| 2007/0233383 A1 | * | 10/2007 | Churan | G01S 19/21 |
| | | | | 701/469 |
| 2010/0188304 A1 | * | 7/2010 | Clymer | H01Q 1/185 |
| | | | | 343/753 |
| 2011/0176479 A1 | * | 7/2011 | Booton | H04B 7/01 |
| | | | | 370/321 |
| 2013/0122929 A1 | * | 5/2013 | Al-Mufti | H04W 24/00 |
| | | | | 455/456.1 |
| 2014/0203963 A1 | * | 7/2014 | Shimada | G04R 40/02 |
| | | | | 342/357.51 |
| 2017/0085329 A1 | * | 3/2017 | Ravishankar | H04W 72/0453 |

* cited by examiner

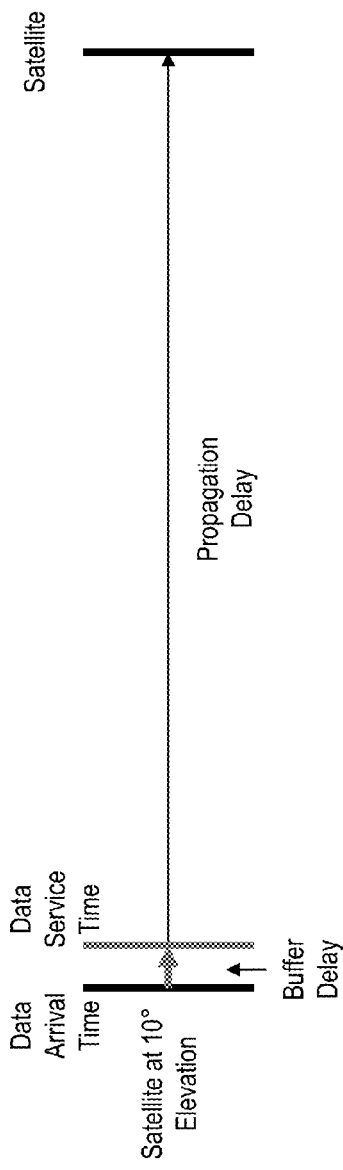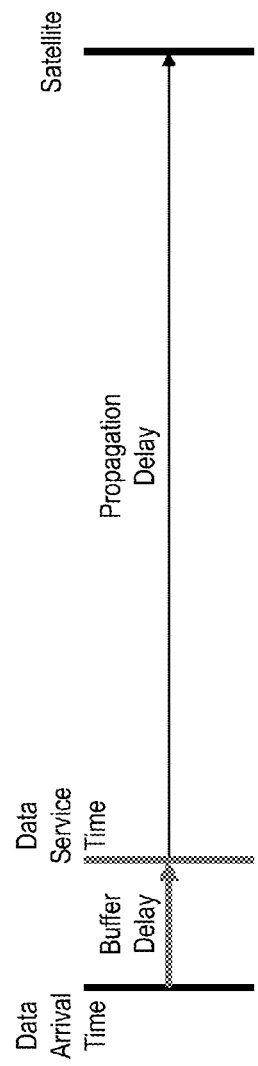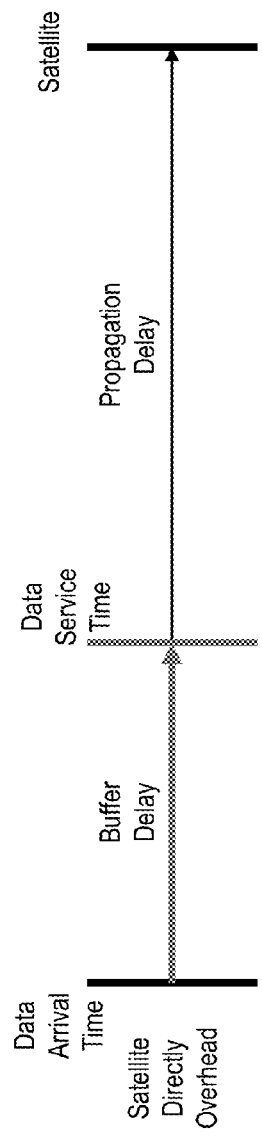

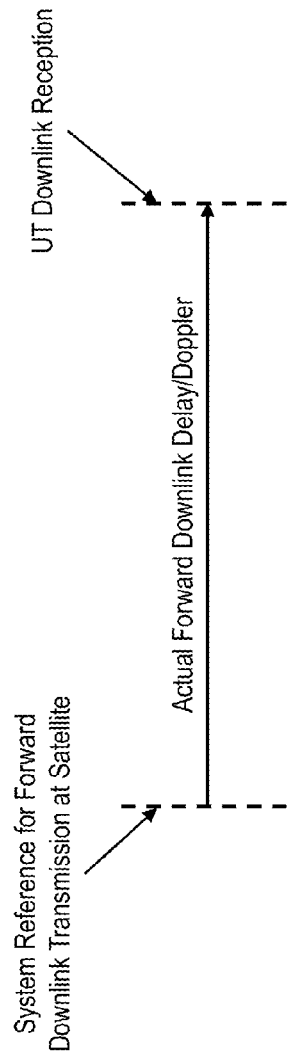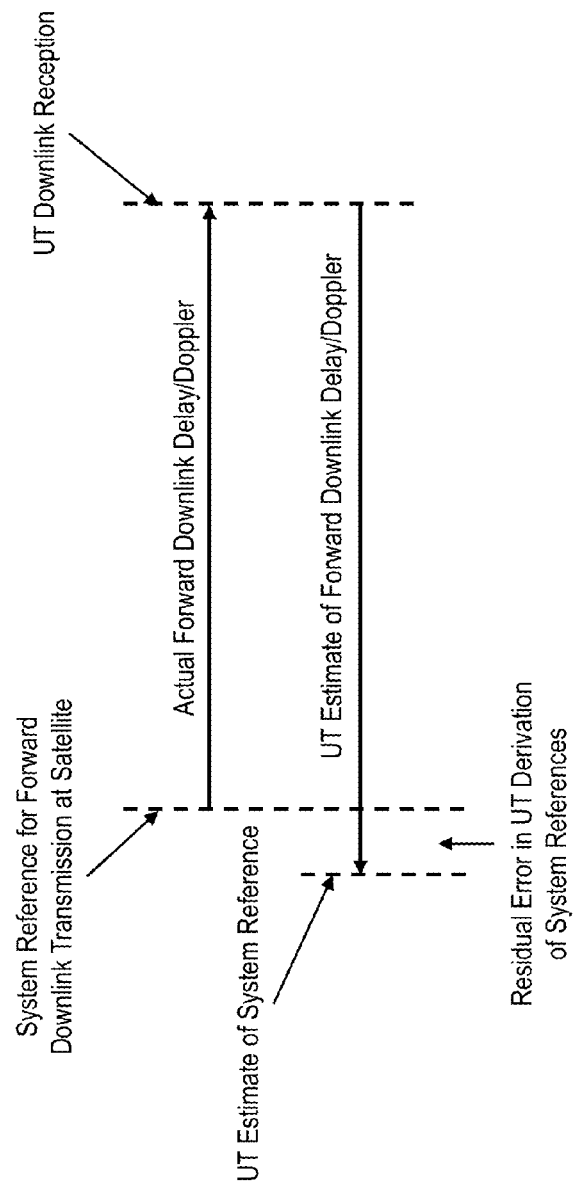
FIG. 6A
FIG. 6B

APPARATUS AND METHOD FOR NETWORK LEVEL SYNCHRONIZATION IN MULTIPLE LOW EARTH ORBIT (LEO) SATELLITE COMMUNICATIONS SYSTEMS

RELATED APPLICATIONS

This application claims the benefit of the earlier filing date under 35 U.S.C. §119(e) of U.S. Provisional Application Ser. No. 61/955,750 (filed 2014 Mar. 19).

BACKGROUND

A geosynchronous satellite (GEO) is a satellite flying in a geosynchronous earth orbit, with an orbital period the same as the Earth's rotation period, whereas a low earth orbit (LEO) satellite flies in an orbit around the Earth at an altitude between 160 kilometers or 99 miles (with an orbital period of about 88 minutes) and 2,000 kilometers or 1,200 miles (with an orbital period of about 127 minutes). Further, in a GEO satellite system, the beam footprint on the Earth is generally fixed based on the satellite antenna configuration. Unlike a GEO satellite, a LEO satellite constellation provides a unique mode of operation and associated challenges, where the footprint of each satellite beam on the Earth is constantly moving. The speed of a LEO satellite as observed from a location on the earth is high, which results in a large satellite motion induced Doppler effect. This large Doppler results in (i) a significant offset in the center frequency of the received signal, (ii) a scaling of the time and the frequency axes that causes the so-called Doppler-induced rubber-band effect (both the symbol or chip durations and the signal bandwidth are stretched or compressed as a result), and (iii) a large rate of temporal variation of the received symbol and frame markers. As a result of this Doppler effect, a LEO satellite system presents unique challenges, for example, in the area of network level synchronization. The LEO system Doppler component, however, exhibits a predictable and deterministic nature, but current LEO systems fail to take advantage of this predictable and deterministic nature to simplify the delay and Doppler domain uncertainty ranges introduced by the LEO system technology, which the physical layer receivers must be designed to resolve.

Accordingly, there is a need for an improved synchronization approach in a LEO satellite system, and a further need for such a synchronization approach that takes advantage of the predictable and deterministic nature of the LEO Doppler component, and thereby simplifies the delay and the Doppler domain uncertainty ranges that the physical layer receivers have to resolve.

SOME EXAMPLE EMBODIMENTS

Example embodiments of the present invention advantageously address the needs above, as well as other needs, by providing a synchronization approach that compensates for the large Doppler offset of the satellites in a LEO satellite system by exploiting the predictable and deterministic nature of the Doppler component, and thereby simplifies the delay and the Doppler domain uncertainty ranges that the physical layer receivers have to resolve. This compensation is based on the known ephemeris of the LEO satellite and the known positions of the gateway (GW) and the user terminal (UT) on the ground. Utilizing the deterministic component of the LEO Doppler, the synchronization process (according to example embodiments of the present invention) continually tracks and compensates for the time-varying offsets between the GW and UT frame timing, frame numbering (FN), symbol timings, and Doppler-induced scaling of center frequency and the signal bandwidth.

In accordance with example embodiments of the present invention, a method is provided for synchronization in a satellite communications system comprising one or more satellites, wherein transmissions to each of at least a one of the satellites occur via a respective communications link with the satellite. A system timing reference is determined based on a global positioning system (GPS) timing reference and a system frequency reference is determined. Timing delay and frequency Doppler factors are periodically determined for each of the satellite(s) to which the transmissions occur based on respective satellite ephemeris data reflecting velocity and direction vector motion of the satellite. The system timing reference is dynamically adjusted based on the timing delay factor, and the system frequency reference is dynamically adjusted based on the frequency Doppler factor, for each of the satellite(s) to which the transmissions occur. Timing and frequency of the transmissions to each of the satellites are synchronized based on the respective adjusted system timing reference and the respective adjusted system frequency reference.

In accordance with further example embodiments of the present invention, a method is provided for synchronization in a satellite communications system comprising one or more satellites, wherein transmissions to each of at least a one of the satellites occur via a respective communications link with the satellite. Frame timing and frequency are determined regarding downlink transmissions received from at least one of the satellites from which such transmissions are received. Transmissions of ephemeris data reflecting velocity and direction vector motion of each of the satellites are received. System timing and a system frequency references are estimated by dynamically adjusting the frame timing and frequency for each of the satellites from which the downlink transmissions are received based on the ephemeris data for the respective satellite, and adjusting local timing and frequency references based on the adjusted frame timing and frequency. Timing and frequency of the transmissions to the satellites are synchronized based on the estimated system timing and frequency references.

BRIEF DESCRIPTION OF THE DRAWINGS

Example embodiments of the present invention are illustrated by way of example, and not by way of limitation, in the figures of the accompanying drawings, and in which like reference numerals refer to similar elements, and wherein:

FIGS. 3A, 3B and 3C illustrate conceptual representations of design goals for the forward feederlink synchronization, in accordance with example embodiments of the present invention;

FIG. 6A illustrates the relation of user terminal (UT) downlink reception time/frequency to system references, in accordance with example embodiments of the present invention;

FIG. 6B illustrates user terminal (UT) estimation of the system reference using downlink reception and LEO satellite ephemeris derived estimates of the downlink Doppler/delay, in accordance with example embodiments of the present invention;

DETAILED DESCRIPTION

Figure 1:
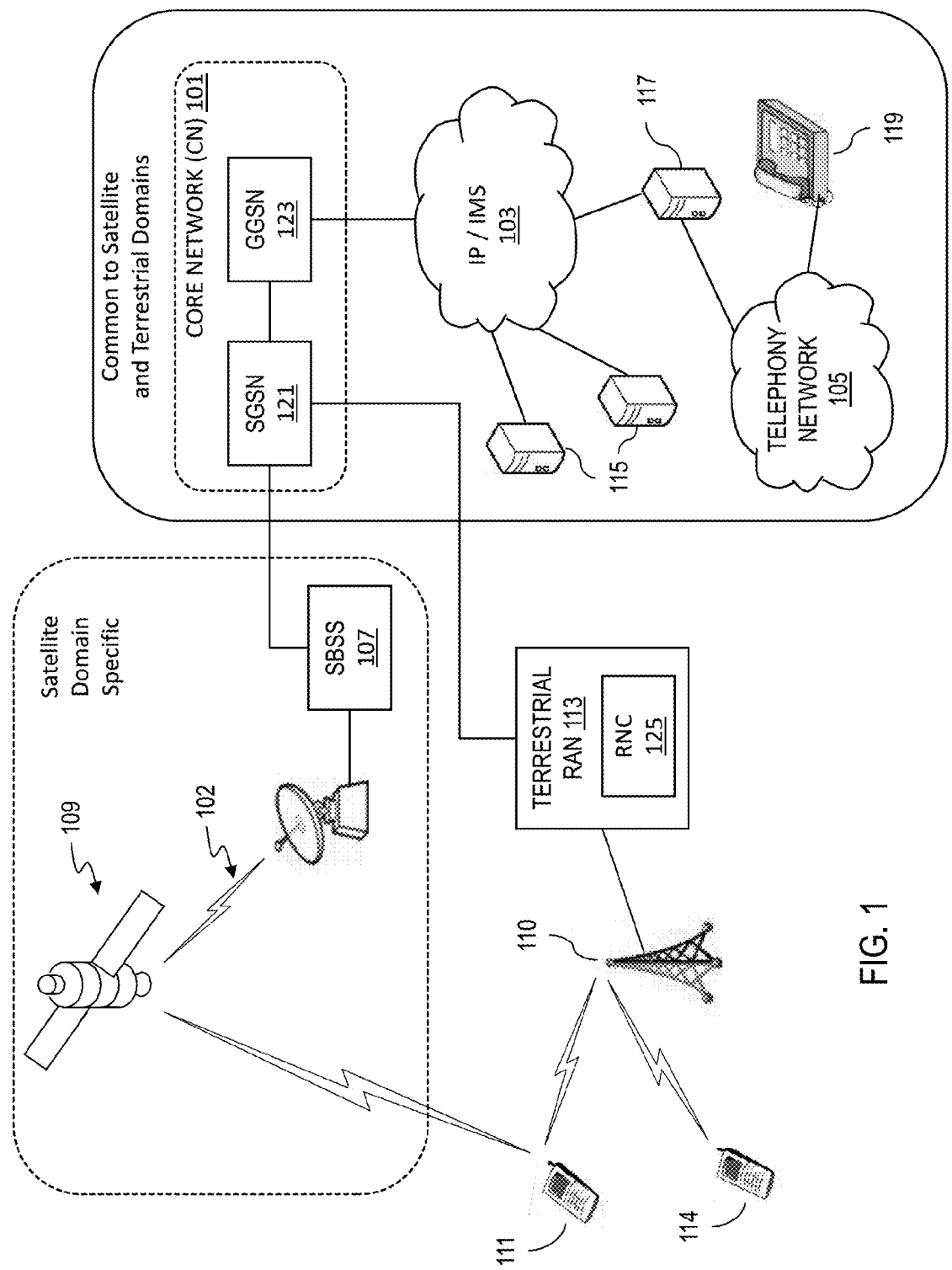
FIG. 1 illustrates a diagram of a communications system capable of providing a synchronization approach, in accordance with example embodiments of the present invention.

An approach for a synchronization process that compensates for the large Doppler offset of the satellites in a LEO satellite system by exploiting the predictable and deterministic nature of the Doppler component, and thereby simplifies the delay and the Doppler domain uncertainty ranges that the physical layer receivers have to resolve, is described. The following description specifies the synchronization approach in the context of the Time Division Multiple Access/Frequency Division Multiple Access (TDMA/FDMA) system, as well as the Code Division Multiple Access (CDMA) system, operating over a LEO satellite constellation. Specifically the UT transmit timing and frequency settings are defined for (i) the TDMA and the CDMA modes of operation, and (ii) for the single-satellite or multi-satellite diversity modes of operation.

Further, in the following description, for the purposes of explanation, numerous specific details are set forth in order to provide a thorough understanding of the invention. It will be apparent to one skilled in the art, however, that the invention may be practiced without these specific details or with an equivalent arrangement, and in other instances, well known structures and devices are shown in block diagram form in order to avoid unnecessarily obscuring the invention. Further, as will be appreciated, a module or component (as referred to herein) may be composed of software component(s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components. Further, with respect to the various exemplary embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention.

Further, various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

FIG. 1 illustrates a diagram of a communications system capable of providing a synchronization approach, in accordance with example embodiments of the present invention. The terrestrial radio access network (RAN) 113 is the element in a mobile communications network that implements the radio access technology of the underlying physical connection methods for a radio based communications network. The RAN generally provides connection between the user terminal (UT) 111/114 (e.g., a mobile phone) and the core network (CN) 101. The CN comprises the central part of a telecommunications network, which generally provides services (e.g., routing calls across a public service telephony network (PSTN) 105 to end users utilizing the telecommunications network via an access network 103). Example embodiments further provide approaches for the approximation of handover factors to evaluate available paths and make handover decisions, when the radio access network (RAN) cannot acquire full information necessary to evaluate all the factors. Moreover, according to example embodiments, forward link and return link handovers are evaluated independently, and no symmetry is assumed between the forward and return path beam patterns and path metrics evaluation.

With further reference to FIG. 1, in the system 100, the UT 111/114 has the capability to communicate over a satellite link (via the satellite 109 and satellite base station subsystem (SBSS) or satellite gateway (GW) 107) to the wireless core network (CN) 101, or communicate over a terrestrial wireless cell station or tower 110 with a terrestrial radio access network (RAN) 113 to the wireless core network (CN) 101. The RAN comprises a radio network controller (RNC) 125, which is responsible for the radio resource management functions and certain mobility management functions of the network. By way of example, the data network 103 is configured as an IP/IMS (Internet protocol (IP) Multimedia Subsystem) with multiple application servers 115 supplying multimedia content. The data network 103 couples to the PSTN 105 via a media gateway 117; the PSTN can serve one or more voice terminals 119. The feederlink consists of the forward or uplink segment of the communications link (102) between the GW or SBSS 107 and the satellite.

A radio access bearer (RAB) is associated with Packet Data Protocol (PDP) context maintained between the user terminal (UT) 111/114 and the core network (CN) 101. For instance, one RAB can be established for Session Initiation Protocol (SIP) call signaling, and be maintained as long as the user wishes to make and receive calls. Another RAB is established on demand for the transport of the voice media while a call is in session. The satellite radio access network establishes and maintains Radio Bearers (RBs) between the UT and the SBSS 107 necessary to satisfy, for example, Quality of Service (QoS) requirements of the SIP call signaling and Voice over IP (VoIP) user plane RABs. The signaling radio bearer supports signaling connectivity between the UT and the satellite radio access network.

SIP protocol is typically used for establishing the initiation, and the management, of a session. A SIP message mainly contains three sections detailing the session, timing and media descriptions. A Packet Data Protocol (PDP) context is created for each session initiated, which contains the desired characteristics of the specific session, including the PDP type and the demanded QoS among other parameters. A PDP context can be viewed as a set of information maintained by a user terminal (UT), gateway general packet radio service (GPRS) support node (GGSN) and serving GPRS support node (SGSN). It contains a PDP type that identifies the type of Packet Data Network (PDN), the PDP address, QoS information and other session information. Activating a PDP context refers to creating the PDP context at the UT, SGSN and GGSN so that UT can communicate with an entity in PDN using the PDP address maintained in the PDP context. Further, a secondary PDP context activation allows the subscriber to establish a PDP context with a different QoS profile to the same PDN.

The Core Network (CN) 101 may include a Proxy-Call Session Control Function (P-CSCF), a Serving-Call Session Control Function (S-CSCF), an Interrogating-Call Session Control Function (I-CSCF), a Media Resource Function Controller (MRFC), a Media Resource Function Processor (MRFP), a Media Gateway (MGW), a Media Gateway Controller Function (MGCF) and a Signaling Gateway (SGW). Note that these components are the components that relate to Session Initiation Protocol (SIP). For other applications, however, the CN 101 may include different components. Additionally, all such components associated with SIP signaling are known in the art, and thus are not shown in the Figures and their functionality is not discussed in detail herein.

Moreover, as will be appreciated, system 100 may embody many forms and include multiple and/or alternative components and facilities.

Figure 2A:
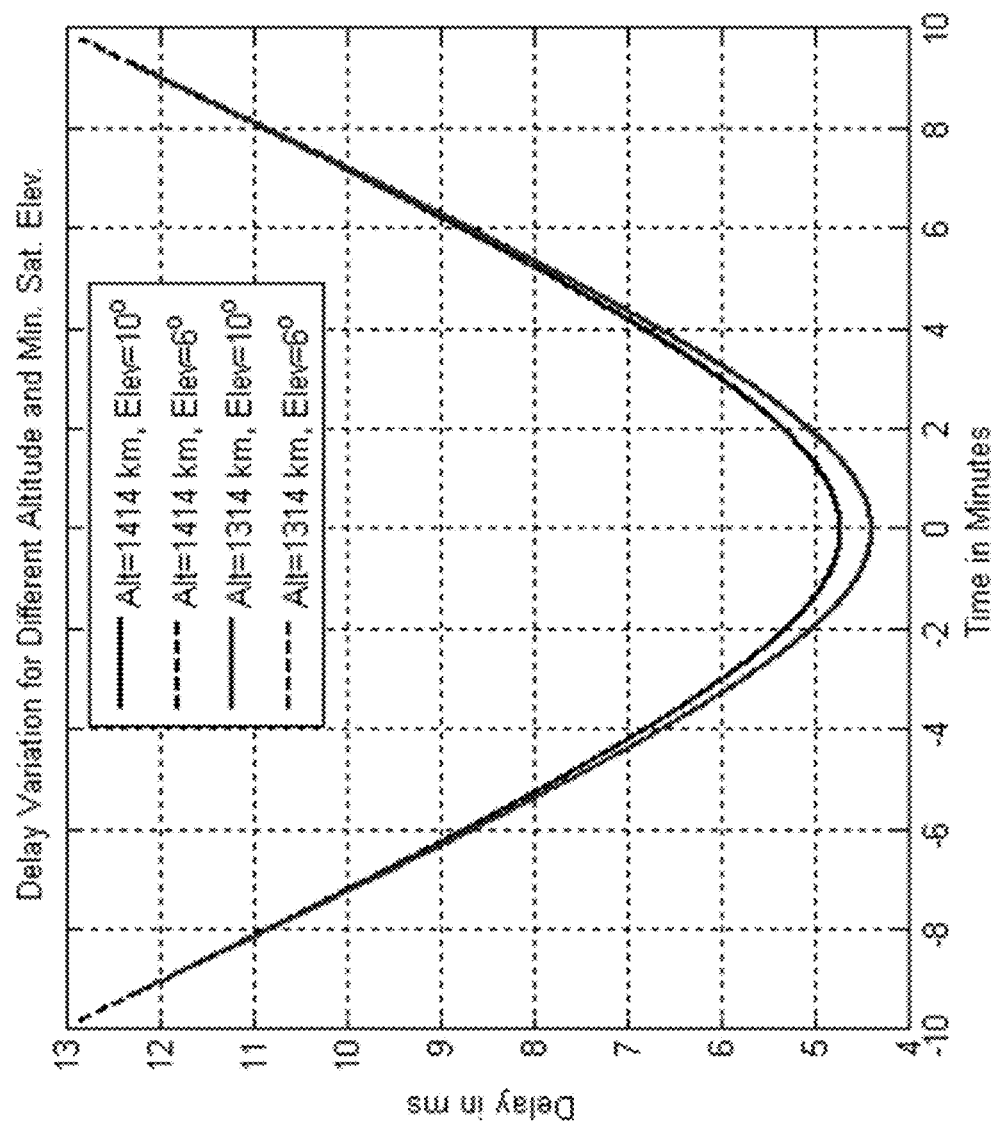
FIGS. 2A, 2B and 2C typical example profiles of temporal variation of delay, Doppler and Doppler rate, respectively, with regard to a low Earth orbit (LEO) satellite link.
Figure 2B:
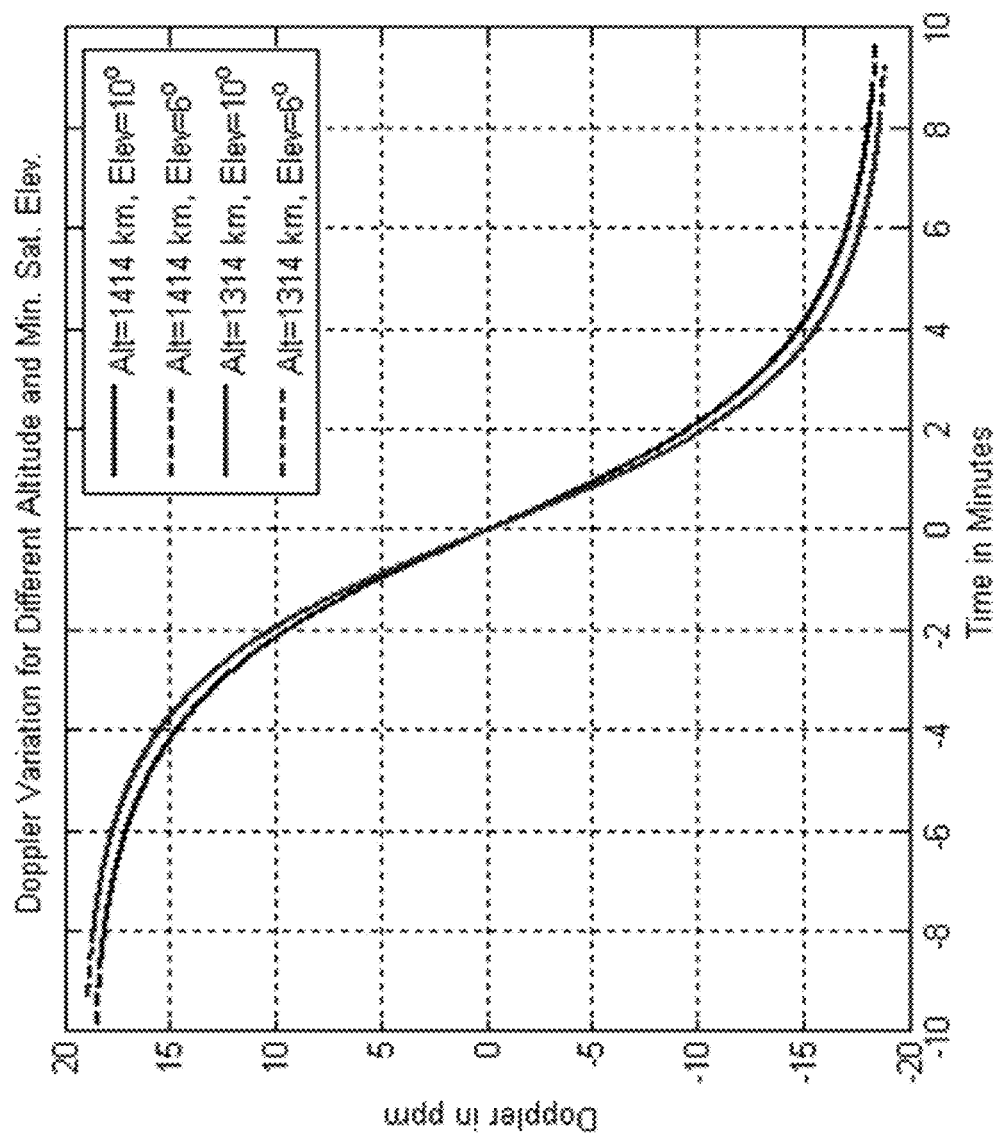
Figure 2C:
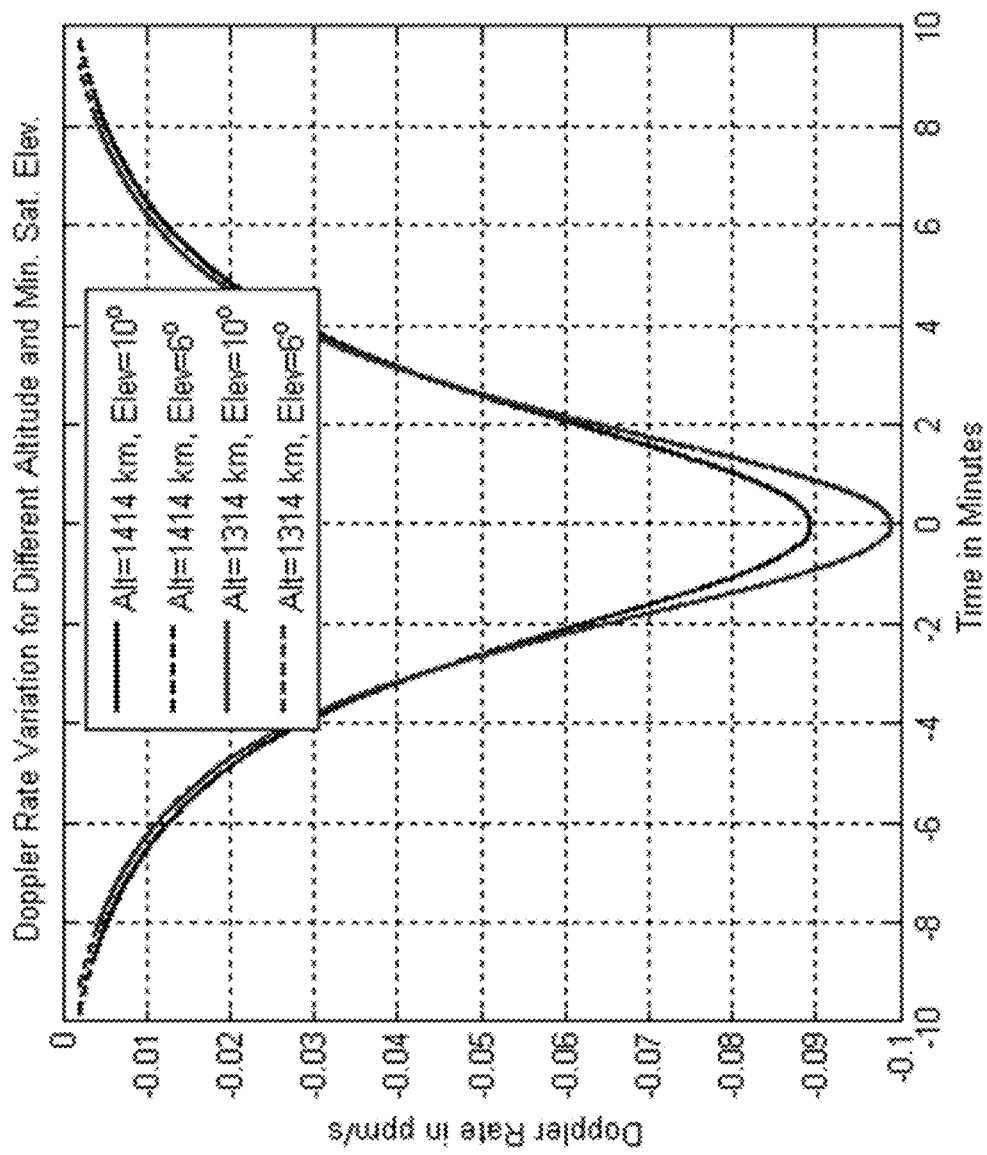

A LEO satellite (e.g., satellite 109) travels in its orbit relative to the Earth at a relatively high speed, which results in fast variations in link delay and Doppler as observed from the ground. FIGS. 2A, 2B and 2C typical example profiles of temporal variation of delay, Doppler and Doppler rate, respectively, with regard to a low Earth orbit (LEO) satellite link. The LEO satellite is at a height of 1,414 km relative to the mean sea level, and orbits around the Earth in a plane inclined with respect to the equatorial plane at an angle of 52°.

According to example embodiments, for the synchronization process at the GW, the GW utilizes knowledge the LEO satellite ephemeris information transmitted by each LEO satellite, and the respective positions of the GW and of the UT. Similarly, for the synchronization process at the UT, the UT utilizes the knowledge of the LEO satellite ephemeris information and its position as well. With regard to the UT knowledge of the LEO ephemeris information, the LEO satellite ephemeris data is broadcast by the GW on the forward link (the uplink from the GW to the LEO satellite and the respective downlink from that LEO satellite to the UT). Further, such example embodiments provide for increased efficiencies in the UT forward link signal acquisition and handover measurement processes, in the paging messaging transmission from the GW and the reception at the UT, and in GW return link signal acquisition and handover measurement processes. Such increased efficiencies result in (i) faster signal acquisition times at the UT and at the GW and faster satellite-to-satellite handover times, (ii) a quicker response times for UT response to GW paging messages, (iii) an improvement in the UT battery life, (iv) a reduction in the satellite power and bandwidth consumed for sending paging messages to UTs, and (v) a reduced complexity of the GW and the UT acquisition and tracking receivers (in that, based on the continuous and more accurate software-based synchronization methods provided hereby, the UT acquisition and tracking receiver hardware can implement narrower and more targeted searches for timing and frequency synchronization).

In accordance with example embodiments of the present invention, the following comprises a summary of the provided time and frequency synchronization approaches, whereby, on the forward link, the timing, frequency and frame numbering of the frames transmitted by the GW are aligned to a GPS-derived system reference at the satellite. By way of example, all GWs in the system synchronize to a common system reference time based on a GPS system reference time. Further, each GW continuously tracks the common system reference timing and applies a delay correction and a Doppler correction based on ephemeris information from the respective satellite (e.g., information that reflects real-time velocity and direction vectors of the satellite movement). For example, such continuous tracking and correction of the system reference time may be applied on a frame-by-frame or slot-by-slot basis such that any error in timing will never drift beyond a limited amount (e.g., such a time slot may generally be restricted between 1 ms and 20 ms, and thus only a minimal timing error may be experienced within that 1 ms to 20 ms window before the system reference time is updated again). In that regard, all GWs in communication with a common satellite will transmit to that satellite in the synchronize matter so that their respective transmissions do not overlap with each other in frequency or time when received at the satellite.

Similarly, on the UT side, the synchronization approaches of example embodiments utilize the UT position, along with UT velocity and direction vectors that reflect the real-time movement of the UT, to compensate for delay and Doppler shifts based on the UT movement. Further, on a broadcast channel, the GW broadcasts the ephemeris data for each LEO satellite to all UTs serviced by that broadcast channel.

Each UT can thereby adjust its receive synchronization (synchronization with respect to the downlink from the satellite) based on delay and Doppler corrections for both the movement of the UT and the movement of the respective satellite. In other words, the UT adjusts its timing and frequency window for acquisition of the downlink transmissions from the satellite in view of timing and frequency compensations based on the movement of the satellite and the UT (e.g., the UT receivers adjust their timing and frequency acquisition windows to be centered on the UT estimate of the satellite transmission timing and frequency based on the ephemeris information regarding the respective satellite). Further, the UT need not necessarily have knowledge of the GPS-based system timing reference, but instead applies the delay and Doppler adjustments to a timing reference based on an internal UT clock, and adjusts the receive timing and frequency acquisition windows to accommodate for any variation between the UT internal clock and a system reference timing controlled by the GW. With regard to UT uplink transmissions to the satellites, for a path or link diversity purposes, the UT does not target it's transmissions at any specific satellite, but rather sets its transmission timing and frequency based on its own estimate of the system timing reference maintained by the GW. By way of example, for regulating its local references against the system timing reference, the UT tracks the frame timing and frequency of downlink transmissions from the satellite, and estimates the delay and the Doppler based on the LEO satellite ephemeris broadcast information broadcast by the GW. The UT thereby targets it synchronization to the system reference timing such that any system satellite within view of the UT can efficiently acquire and synchronize with the UT uplink transmissions.

Such synchronization approaches are applicable to (i) CDMA and TDMA/FDMA modes of operation, and (ii) for single-satellite and multi-satellite diversity modes. On the return link (i) for a CDMA system employing multi-satellite diversity, the UT transmissions are nominally aligned to the system reference at the UT antenna, and (ii) for a TDMA/FDMA system (with or without multi-satellite diversity), the UT transmissions are aligned to the system reference at a primary satellite that serves as the synchronization reference.

GW or SBSS Synchronization: By way of example, the GW achieves synchronization by means of the LEO satellite ephemeris data. This knowledge allows the GW to continually estimate GW to satellite feederlink and mobilelink delay and the Doppler.

GW Forward Feederlink Timing and Frequency Synchronization Using Ephemeris: By way of further example, for the forward feederlink synchronization, the GW continuously adjusts transmit timing and frequency of all the forward uplink transmissions to each satellite to compensate for the feederlink delay and Doppler. The GW calculates the required transmission offsets from the ephemeris data, and applies the calculated offsets to a system-level synchronization reference signal (e.g., derived from the GPS signal).

GW Return Link Synchronization: By way of further example, GW return link synchronization is achieved on a per-user basis. Each UT uplink transmission is required to be aligned to an accurate GPS-based system reference at the GW, which, along with a precise knowledge of the mobile uplink and the feeder downlink delay and Doppler offsets, allows the GW to track each return link diversity path of each user individually.

UT Synchronization: By way of further example, the UT achieves synchronization by means of LEO satellite ephemeris data (in either a compressed or uncompressed form) that is broadcast by the GW on the forward link control channel. This knowledge allows the UT to continually estimate mobilelink delay and the Doppler.

UT Synchronization at Initial Access and at Handover: By way of further example, in the usual case of system access at warm start or at the handover, the UT has the knowledge of the mobilelink delay and Doppler that allows for a quick acquisition of the candidate forward link pilot channel. Only at the cold start, the UT may not have the a-priori information that reduces its beam search process, and thus it may have to perform a full search over the entire forward mobilelink Doppler uncertainty for each possible FDM and forward PN code combinations.

UT Dedicated and Packet Data Channel Synchronization: By way of further example, after entering the idle mode and while in the connected mode, the UT continuously disciplines its oscillator and clock by tracking the pilot signal received on the forward downlink. Furthermore, based on the knowledge of the ephemeris data, the UT compensates for the downlink delay and Doppler in the tracked signal. In CDMA systems with multi-satellite diversity option, the UT transmits at this system aligned timing and frequency on the return uplink. In TDMA/FDMA systems, the UT additionally pre-compensates its transmission for the return uplink delay and Doppler offsets on the link to the primary LEO satellite.

UT Frame Number Synchronization: By way of further example, the GW broadcasts on the forward link the frame number, and the long code state, if applicable, that are used by the UT for the forward link reception and the return transmission.

GW Forward Feederlink Synchronization:

In accordance with example embodiments, a GW synchronization process for forward feederlinks of multiple LEO satellites is provided, which is applicable for both TDMA/FDMA and CDMA systems. One purpose of GW forward feederlink synchronization is to compensate for the known components of delay and Doppler variations, given the satellite ephemeris and the positions of the GW and the UT on the ground. FIGS. 3A, 3B and 3C illustrate conceptual representations of design goals for the forward feederlink synchronization, in accordance with example embodiments of the present invention. One goal of synchronization is to ensure that the frame timing, frequency, chip rate, and frame numbering at the satellite are aligned to the respective system references. A goal of the feederlink synchronization is to eliminate the effect of relative motion between the GW and the satellite, by means of a buffering and clock adjustment processes, which ensures that the GW is synchronized to the satellite in timing, frequency, chip rate bandwidth definition and frame numbering. Further, a goal of the GW with respect to feeder uplink transmission is to advance the transmit frame timing relative to a GPS derived frame reference by the instantaneous value of the GW to satellite delay. Denoting the system-aligned frame reference markers as common frame references or CFR timing ticks (TGPS-REF), the GW delay synchronization process ensures that the forward link frames transmitted by the GW are aligned to the CFR at the S-band transmit antenna of the satellite. The illustration of FIG. 3A corresponds to a satellite location of 10 degrees for which the propagation delay is maximum, and thus the required buffer delay is minimum, the illustration of FIG. 3B corresponds to an intermediate satellite position, and the illustration of FIG. 3C corresponds to a satellite directly overhead, for which the propagation delay is minimum, and thus the buffer delay is maximum.

Figure 4:
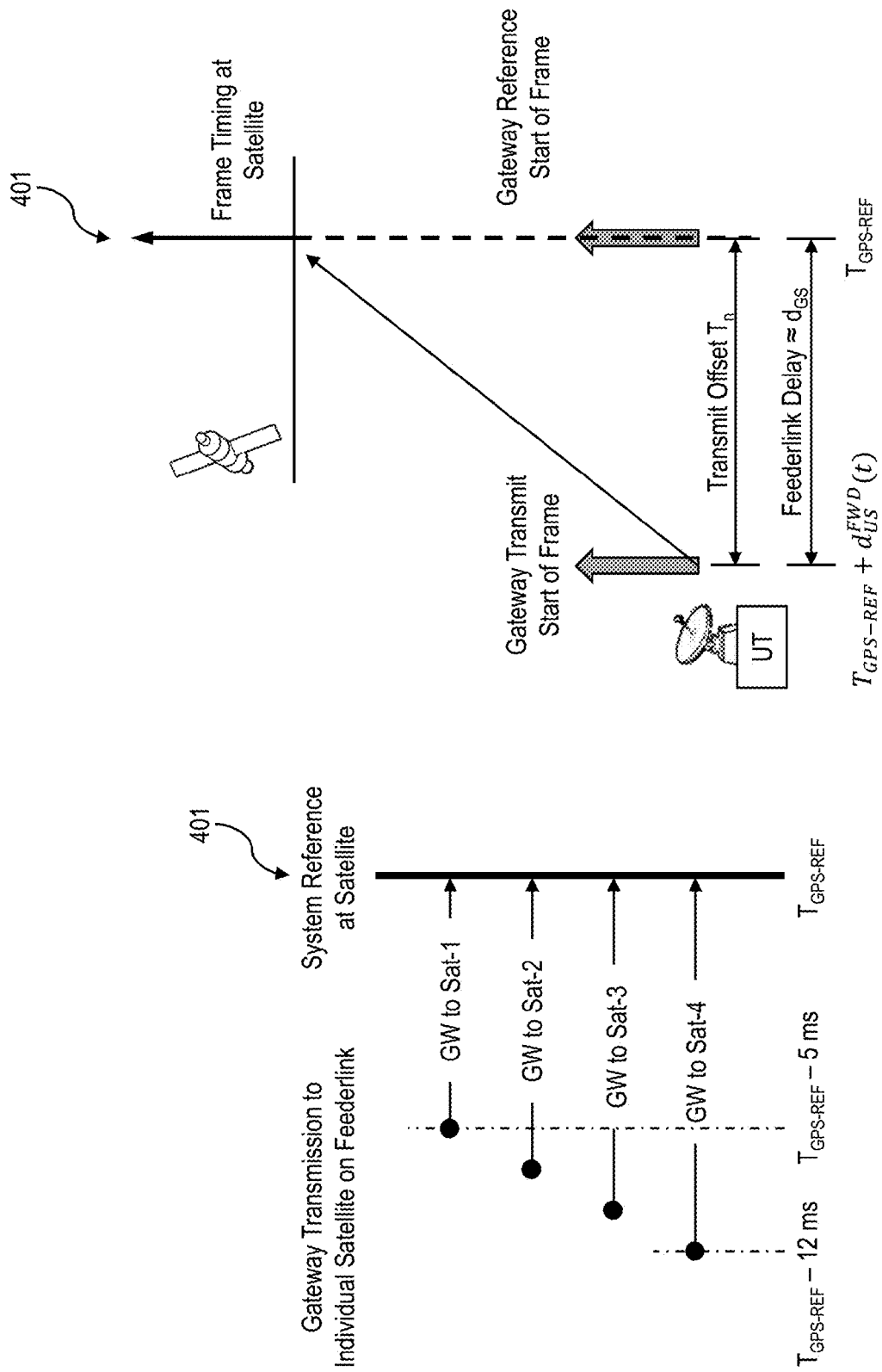
FIG. 4 illustrates a timing diagram for a gateway (GW) forward feederlink synchronization timing, in accordance with example embodiments of the present invention.

FIG. 4 illustrates a timing diagram for a gateway (GW) forward feederlink synchronization timing, in accordance with example embodiments of the present invention. The timing diagram of FIG. 4 shows the resulting timing for a GW transmission to multiple LEO satellites on the forward feederlinks. According to one embodiment, a detailed derivation of the GW transmit start-of-frame $T_{GW-TX}(t)$ for all forward link traffic, the receive start-of-frame $T_{GW-RACH-RX}(t)$ for RACH reception and the receive start of frame $T_{GW-PDCH-RX}(t)$ for packet data channel (PDCH) reception is provided. To achieve the forward feederlink frame timing synchronization, the GW transmits on the forward link at time:

$$T_{GW-TX}(t) = T_{GPS-REF} - d_{GS}^{FWD}(t) - d_{C-S} - d_{HW},$$

where $T_{GW-TX}(t)$ is the GW transmit frame marker, $T_{GPS-REF}$ is the nominal (GPS-derived system-reference) frame timing marker at the satellite antenna, $d_{GS}^{FWD}(t)$ is the forward feederlink delay, $d_{C-S}$ is the C to S-band transponder delay, and $d_{HW}$ is the GW hardware delay. The satellite receives the forward frame at time:

$$T_{SAT-RX,C}(t) = T_{GW-TX}(t) + d_{GS}^{FWD}(t) + d_{HW} = T_{GPS-REF} - d_{C-S};$$

and the satellite transmits on S-band at the nominal frame timing of:

$$T_{SAT-TX,S}(t) = T_{SAT-RX,C}(t) + d_{C-S} = T_{GPS-REF}.$$

Accordingly, $T_{SAT-TX,S}(t) = T_{GPS-REF}$, and the system synchronization is achieved on the forward feederlink, and the GW forward feederlink frame timing synchronization ensures that the frame timing at the satellite forward link S-band antenna is aligned to the system reference $T_{GPS-REF}$.

With reference to FIG. 4, with the satellite transmit frame timing aligned to $T_{GPS-REF}$ (401), the UT receives the downlink frame, after a delay $d_{US}^{FWD}(t)$ from the satellite to UT, at $T_{GPS-REF} + d_{US}^{FWD}(t)$. Thus, a key equation for the forward link transmit frame timing is provided, as follows:

$$T_{GW-TX}(t) = T_{GPS-REF} - d_{GS}^{FWD}(t) - d_{HW} - d_{C-S}.$$

The above can be written as follows:

Gateway $TxSoF = CFR - (T_n \bmod T_{frame})$, where, Gateway CFR $T_{GPS-REF}$ is derived from the GPS signal received from the legacy system, and $T_n = d_{GS}^{FWD}(t) + d_{HW} + d_{C-S}$ denotes transmit start of frame (TxSoF) offset relative to the CFR.

Figure 5:
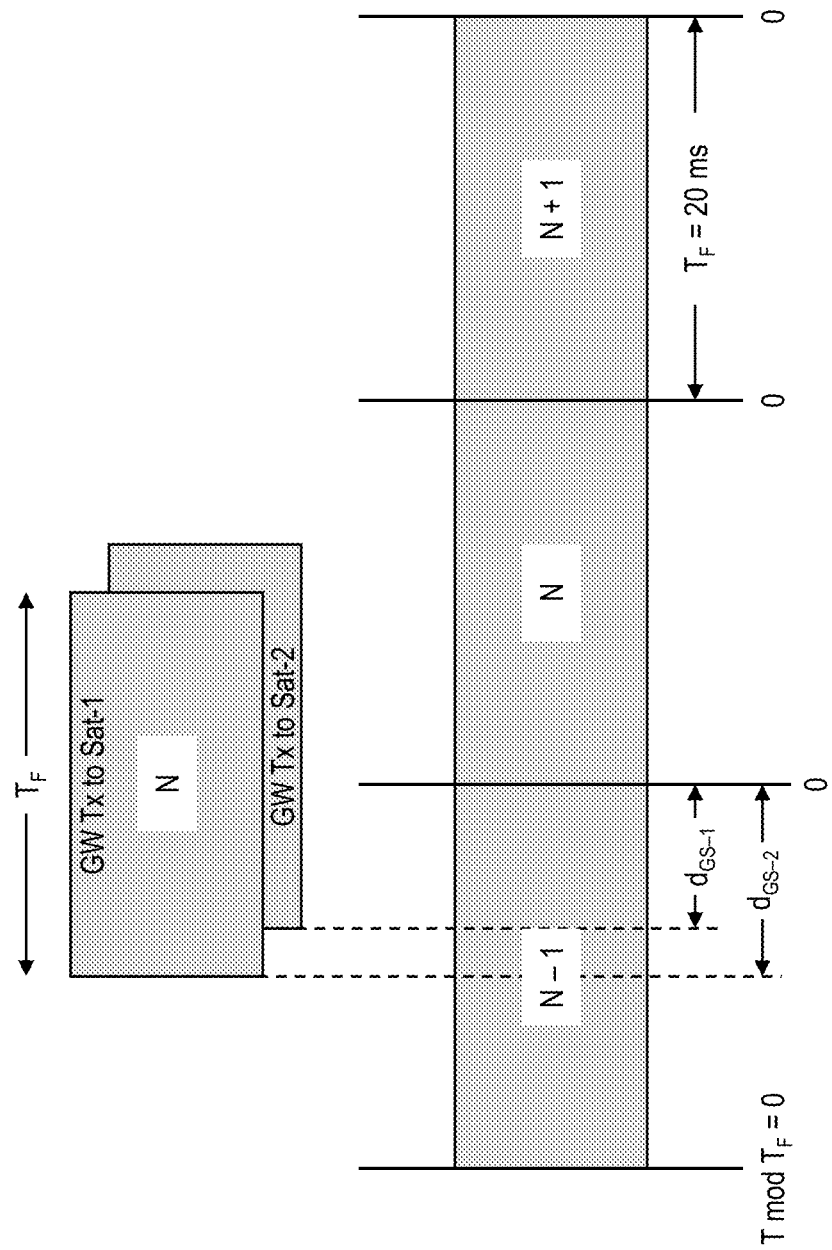
FIG. 5 illustrates frame number synchronization timing for feeder uplink, in accordance with example embodiments of the present invention.

FIG. 5 illustrates frame number synchronization timing for feeder uplink, in accordance with example embodiments of the present invention. A goal of the frame-number synchronization is to ensure that the frames received at the satellite from the GW on the forward link (e.g., frames transmitted from the GW to the satellite one (Sat-1) and frames transmitted from the GW to the satellite two (Sat-2), as illustrated in FIG. 5) are synchronized with the GPS-derived Frame Number (FN). By way of example, to achieve this goal, the GW may use the following rule to determine the frame numbers of the transmitted and received packet data channel (PDCH) frames.

The transmitted frame number =

$$FN + \left\lceil \frac{d_{GS}^{FWD}(t) + d_{HW} + d_{C-S}}{T_F} \right\rceil = FN + 1,$$

where FN denotes the GPS-derived frame number at the GW at the time of transmission or the reception of the actual TDMA frame. For $T_F = 20$ ms, the above two equations simplify to the following: GWTransmitFN=FN+1 and GWReceiveFN=FN, as also illustrated in FIG. 5.

In accordance with further example embodiments, the GW forward feederlink frequency synchronization process can be described as follows. The GW synchronization process described earlier, for compensating for the Doppler scaling of the signal bandwidth, is implemented at the baseband. Subsequent Doppler compensation of the GW local oscillator used for up/down-conversion is achieved by GW transmit frequency pre-compensation. A goal for the GW with respect to the feeder uplink transmission is to advance the transmit frequency by the instantaneous value of the GW to satellite Doppler shift.

According to one embodiment, a derivation of the transmit frequency offsets required to accomplish frequency synchronization is provided, as follows. To achieve forward feederlink frequency synchronization, the GW transmits on the forward link at frequency:

$$F_{GW-TX}(t) = (F_S + F_{C-S} \times (1 + \beta_{sat}(t)))/(1 + \alpha_{GS}^{FWD}(t));$$

where $F_{GW-TX}(t)$ is the GW transmit frequency, $F_S$ is the nominal (system-reference) frequency at the satellite antenna, $\beta_{sat}(t)$ is the satellite reference oscillator drift, $\alpha_{GS}^{FWD}(t)$ is the feederlink fractional Doppler, and $F_{C-S} = F_S - F_C$ is the feederlink to mobilelink frequency conversion factor. The Satellite receives a forward feederlink frequency:

$$F_{SAT-RX,C}(t) = F_{GW-TX}(t) \times (1 + \alpha_{GS}^{FWD}(t)) = F_S + F_{C-S} \times (1 + \beta_{sat}(t));$$

and the Satellite transmits on mobile forward link at the nominal frequency:

$$F_{SAT-TX,S}(t) = F_{SAT-RX,C}(t) - F_{C-S} \times (1 + \beta_{sat}(t)) = F_S.$$

Accordingly, $F_{SAT-TX,S}(t) = F_S$, and the system synchronization is achieved on the forward feederlink.

UT Synchronization:

In accordance with example embodiments, in a CDMA based network, the UT transmits on the return uplink, such that the transmit frame timing and frequency are nominally aligned to the respective system references. A goal of the UT return link synchronization is the derivation of the system timing and the frequency at the UT. Accordingly, two common choices for system references at the UT may be (i) the downlink frame timing and frequency, and (ii) the timing and frequency of UT free-running (non-disciplined) oscillator. Relative to the GPS-derived system references at the satellite, the first system reference can tolerate a certain error level in timing and frequency (e.g., an error up to ±3.5 ms in timing, and ±18.5 ppm in frequency)—which vary depending on the radius and inclination angle of the LEO satellite orbit. The error in frequency domain for the second system reference may be smaller (e.g., ±5 ppm), however, a free-running oscillator can drift away arbitrarily from the GPS system references. The UT derivation of the system references, according to such example embodiments, however, is based on the LEO satellite ephemeris data received over the BCCH, which achieves more accurate results as compared to either of the two foregoing alternatives (i) and (ii). This accuracy provides for various advantages over such other methods, including: (1) a UT transmitted RACH that exhibits an accurate estimate of the system references is received at the GW with smaller timing and frequency uncertainty, which simplifies the GW RACH receiver implementation; (2) an accurate estimate of the system references at the UT facilitates a smaller acquisition range for the forward link candidate set pilot searcher for the idle and connected mode handover; (3) availability of an accurate system reference at the UT allows tying its transmission to the system reference, which provides for at least the following benefits (i) UT uplink transmission (since it is tied to an independent system reference, as opposed to, for example, any particular mobile downlink that can exhibit a wide delay/Doppler variation range) is isolated from the forward downlink (LEO) satellite to satellite handover, and (ii) the GW-assisted estimation of coarse UT position will not exhibit an ambiguity regarding the offset of UT transmission; and (4) the UT knowledge of the GPS time of the year is accurate (e.g., it is not affected by the mobile downlink delay uncertainty).

FIG. 6A illustrates the relation of user terminal (UT) downlink reception time/frequency to the system references, in accordance with example embodiments of the present invention. FIG. 6B illustrates user terminal (UT) estimation of the system reference using downlink reception and LEO satellite ephemeris derived estimates of the downlink Doppler/delay, in accordance with example embodiments of the present invention. According to one embodiment, the UT derivation of the system references is provided. By way of example, for regulating local references against the system references, the UT (i) tracks the downlink frame timing and frequency, and (ii) estimates the respective delay and the Doppler to the forward link LEO satellite whose downlink it is tracking. By way of further example, the forward link pilot channel and common signaling channels leave the satellite antenna at the system timing $T_{GPS-REF}(t)$ and at the system reference frequency $F_S$. The signal arrives at UT at the following time and frequency (as illustrated in FIG. 6A)—the time of reception at the UT=the system time at the satellite plus the propagation delay $d_{US}^{FWD}(t)$ from the satellite to the UT, as follows:

$$T_{UT-RX}(t) = T_{GPS-REF}(t) + d_{US}^{FWD}(t);$$

and the reception frequency at the UT=the system frequency at the satellite plus the propagation Doppler $F_S \times \alpha_{US}^{FWD}(t)$, as follows:

$$F_{UT-RX}(t) = F_S \times (1 + \alpha_{US}^{FWD}(t)).$$

The UT reads the broadcast LEO satellite ephemeris, and obtains the GPS position fix. Further, with respect to a vehicular or aeronautical UT, the UT may obtain an estimate of its velocity. Using these factors, the UT forms an estimate of the mobile downlink delay $\hat{d}_{US}^{FWD}(t)$ and Doppler $F_S \times \hat{\alpha}_{US}^{FWD}(t)$. The UT estimates the system timing and the system frequency as follows (as illustrated in FIG. 6B)—the system time may be estimated as:

$$\hat{T}_{GPS-REF}(t) = T_{UT-RX}(t) - \hat{d}_{US}^{FWD}(t);$$

and the system frequency may be estimated as:

$$\hat{F}_S(t) = F_{UT-RX}(t) - F_S \times \hat{\alpha}_{US}^{FWD}(t).$$

In the CDMA system, the UT transmits at the estimated system time and system frequency. Whereas, in the TDMA/FDMA system, the UT further estimates the mobile uplink delay $\hat{d}_{US}^{RTN}(t)$ and Doppler $F_S \times \hat{\alpha}_{US}^{RTN}(t)$, respectively. Further, with respect to a vehicular or aeronautical UT, the UT may account in the above estimate for the effects of both the satellite motion as well its own motion. The transmit time reference (TDMA/FDMA) can be reflected as:

$$T_{UT-RX}(t) - \hat{d}_{US}^{FWD}(t) - \hat{d}_{US}^{RTN}(t);$$

And the system frequency reference can be reflected as:

$$F_{UT-RX}(t) - F_S \times \hat{\alpha}_{US}^{FWD}(t) - F_S \times \hat{\alpha}_{US}^{RTN}(t).$$

Figure 7A:
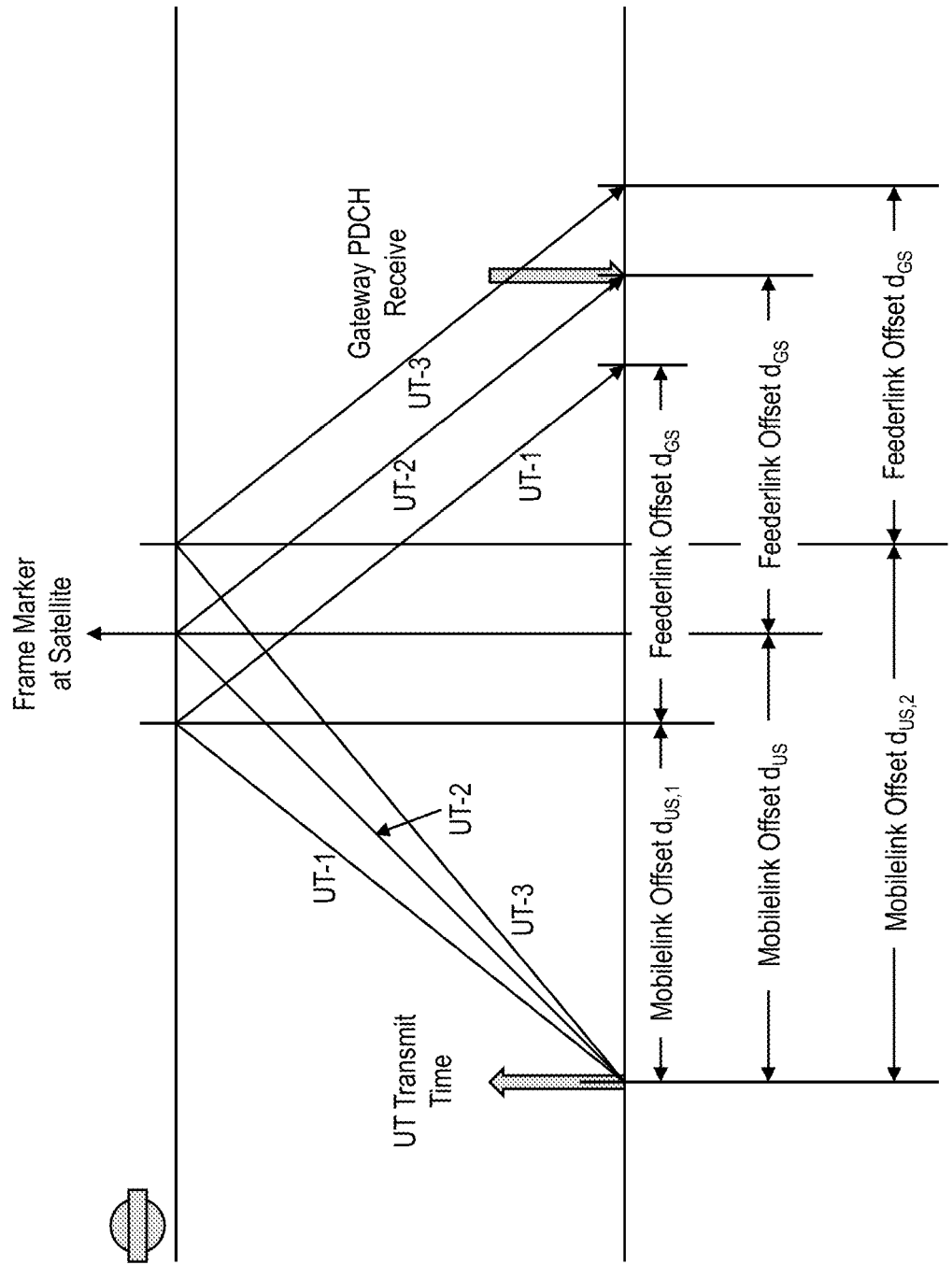
FIG. 7A illustrates transmit (Tx) and receive (Rx) timing for three user terminals (UTs) connected via a common satellite, in accordance with example embodiments of the present invention.
Figure 7B:
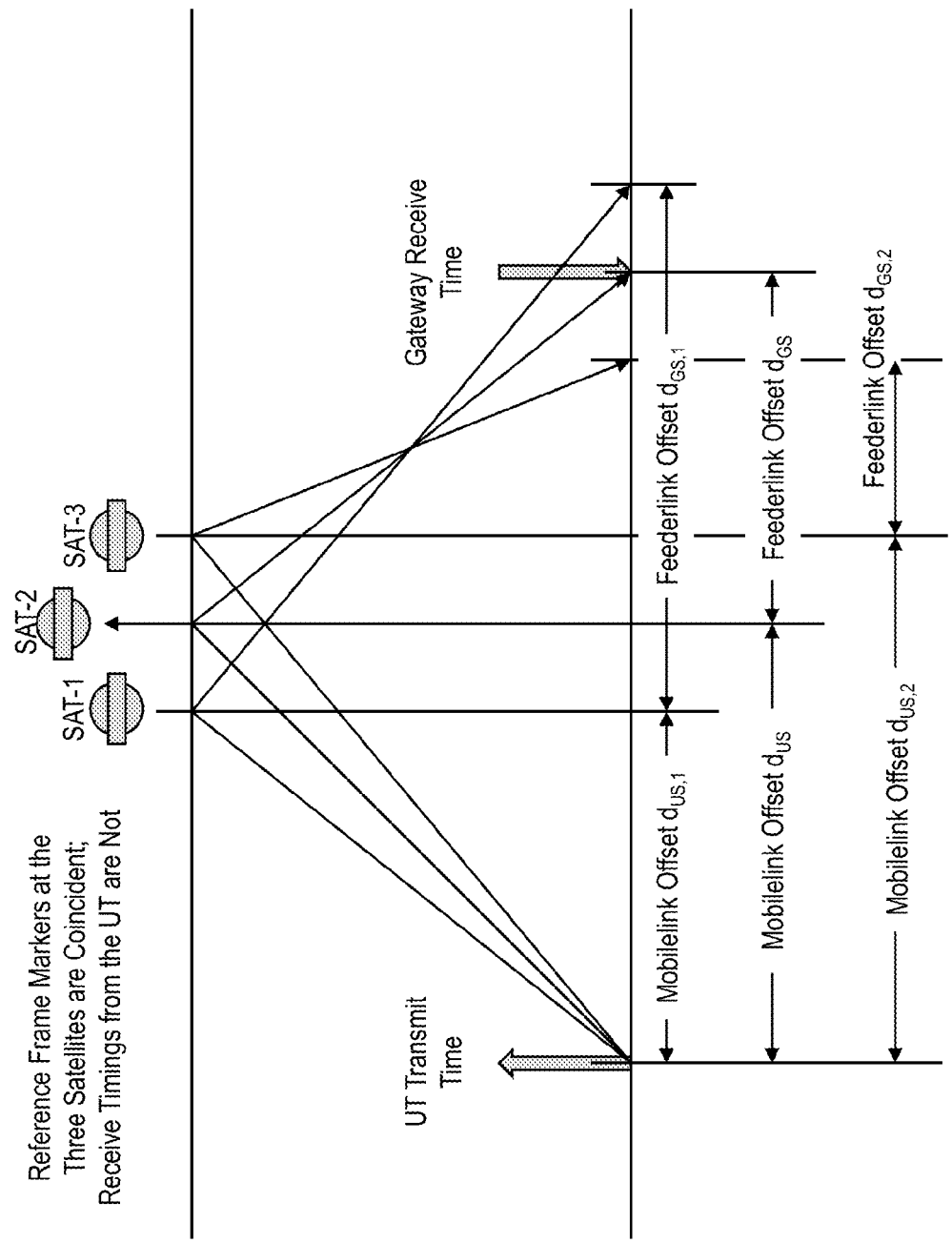
FIG. 7B illustrates transmit (Tx) and receive (Rx) timing for three diversity paths via three satellites for a common user terminal (UT)

FIG. 7A illustrates the transmit (Tx) and receive (Rx) timing for three user terminals (UT-1, UT-2, Ut-3) communicating via a common satellite, in accordance with example embodiments of the present invention. FIG. 7B illustrates the transmit (Tx) and receive (Rx) timing for three diversity paths via three satellites for a common user terminal (UT). With reference to FIG. 7A, based on the UT synchronization discussed above, each UT transmits at a relatively synchronized UT transmit time, as shown by the three respective transmit lines for UT-1, UT-2, UT-3 up to the satellite. As also shown, based on the different location of each UT and the respective motion of each UT, although the transmissions are all transmitted at a synchronized time, the transmissions are received at the satellite at different time offsets from each other. Further, based on the receipt by the satellite at such different time offsets, the return downlink transmissions to the GW are received at similar time offsets. Further, with reference to FIG. 7B, as discussed above with regard to UT transmit synchronization based on an estimated system reference timing for receipt by multiple satellites for path or link diversity (e.g., SAT-1, SAT-2, SAT-3), the UT transmission may be received by such multiple satellites. Similar to the situation of FIG. 7A, based on the movement of the UT, the UT location with respect to each satellite and the respective movement of each satellite, the UT transmission is received at each satellite at a different time offset. Also, based on the Gateway location with respect to each satellite and the respective movement of each satellite, the return downlink transmissions from the satellite are received by the Gateway at different time offsets.

Figure 7C:
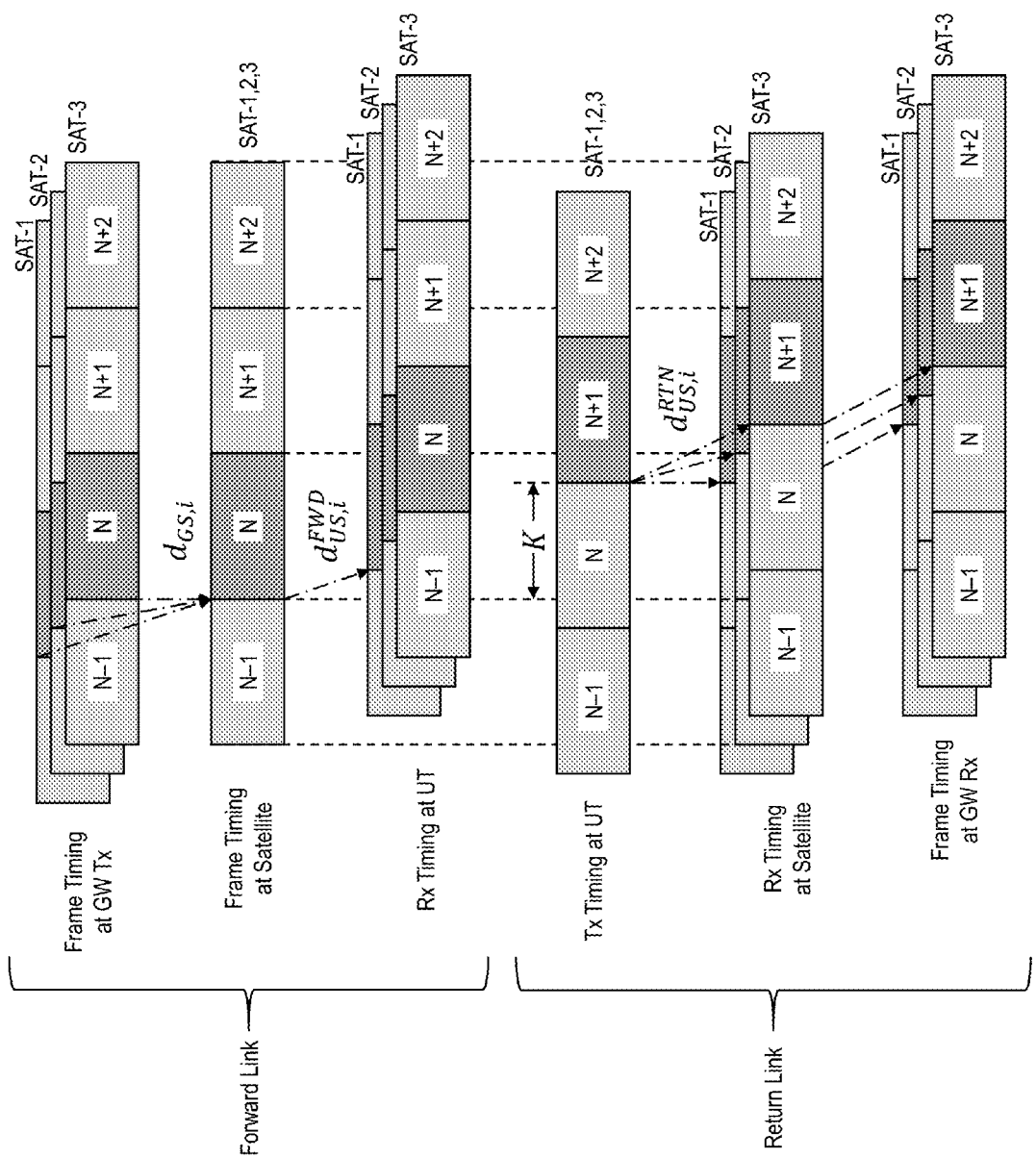
FIG. 7C Illustrates a diagram depicting end-to-end frame timing and frame numbering synchronization for a Code Division Multiple Access (CDMA) system, in accordance with example embodiments of the present invention.

FIG. 7C Illustrates a diagram depicting end-to-end frame timing and frame numbering synchronization for a Code Division Multiple Access (CDMA) system, in accordance with example embodiments of the present invention. With reference to FIG. 7C, the first three frame timing and numbering blocks reflect the forward link. The GW transmit frame timing reflects frame numbering and timing for a forward feeder link transmission to multiple satellites (SAT-1, SAT-2, SAT-3). Based on the synchronization by the GW, the frames received in the frame timing at the satellite in a synchronized fashion. Then, the receive timing at the UT reflects receipt of the transmissions from the respective satellites at different time offsets (again, based on the delay and Doppler associated with the satellite movement, the location of the UT relative to each satellite and the delay and Doppler associated with the movement of the UT relative to each satellite). Further, the last three frame timing and numbering blocks reflect the return link. The UT transmit timing reflects transmission of the respective frames based on the one transmit timing, and the receive timing at the satellite reflects receipt of the UT transmissions at different time offsets (again, based on the delay and Doppler associated with the UT movement relative to each satellite, the delay and Doppler associated with the movement of each satellite and the location of the UT relative to each satellite). Then, the return downlink transmissions from each satellite to the GW are received at similar different time offsets.

Figure 8A:
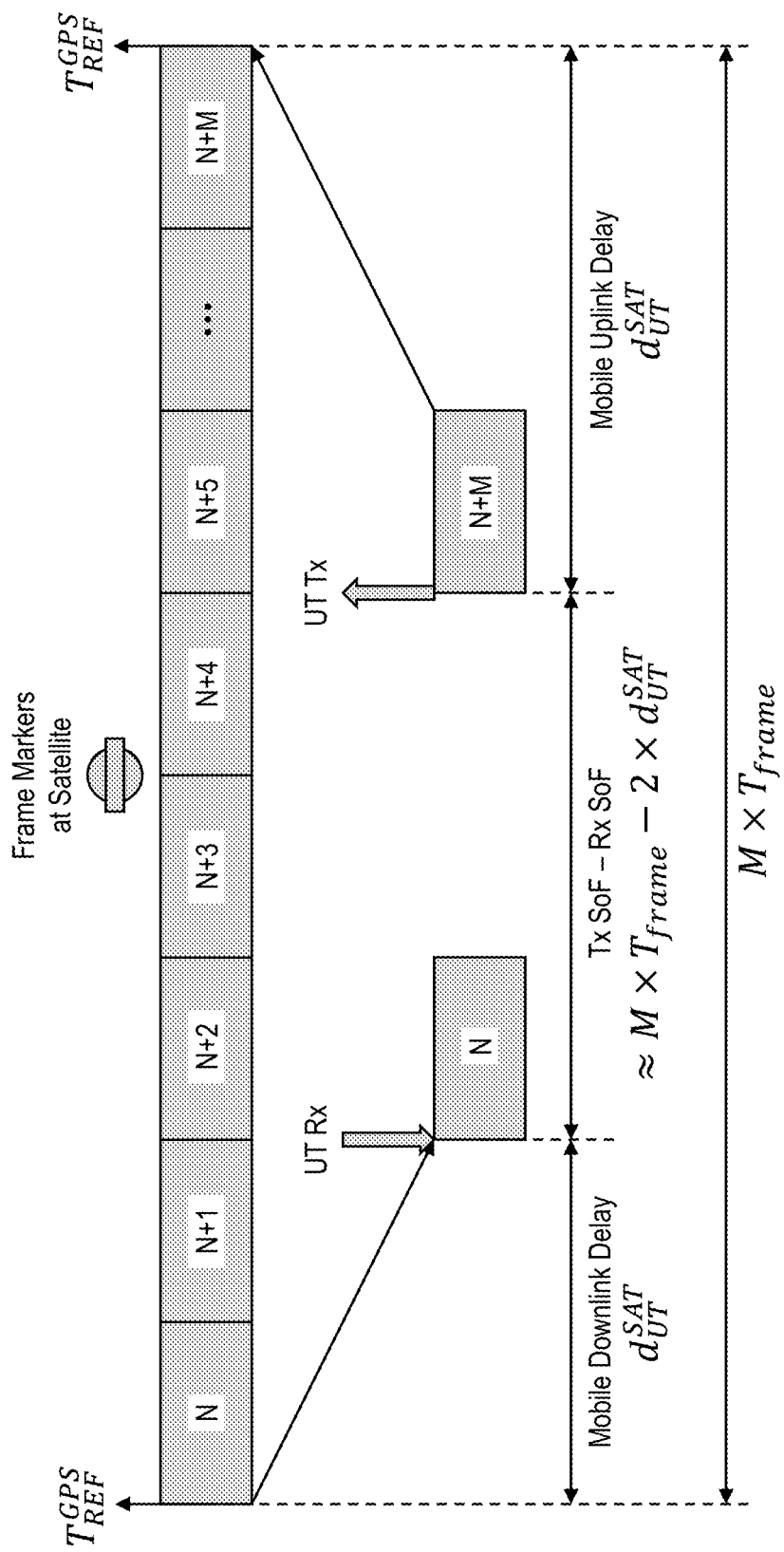
FIG. 8A Illustrates a diagram depicting end-to-end frame timing synchronization for Time Division Multiple Access (TDMA)/Frequency Division Multiple Access (FDMA) systems, in accordance with example embodiments of the present invention.
Figure 8B:
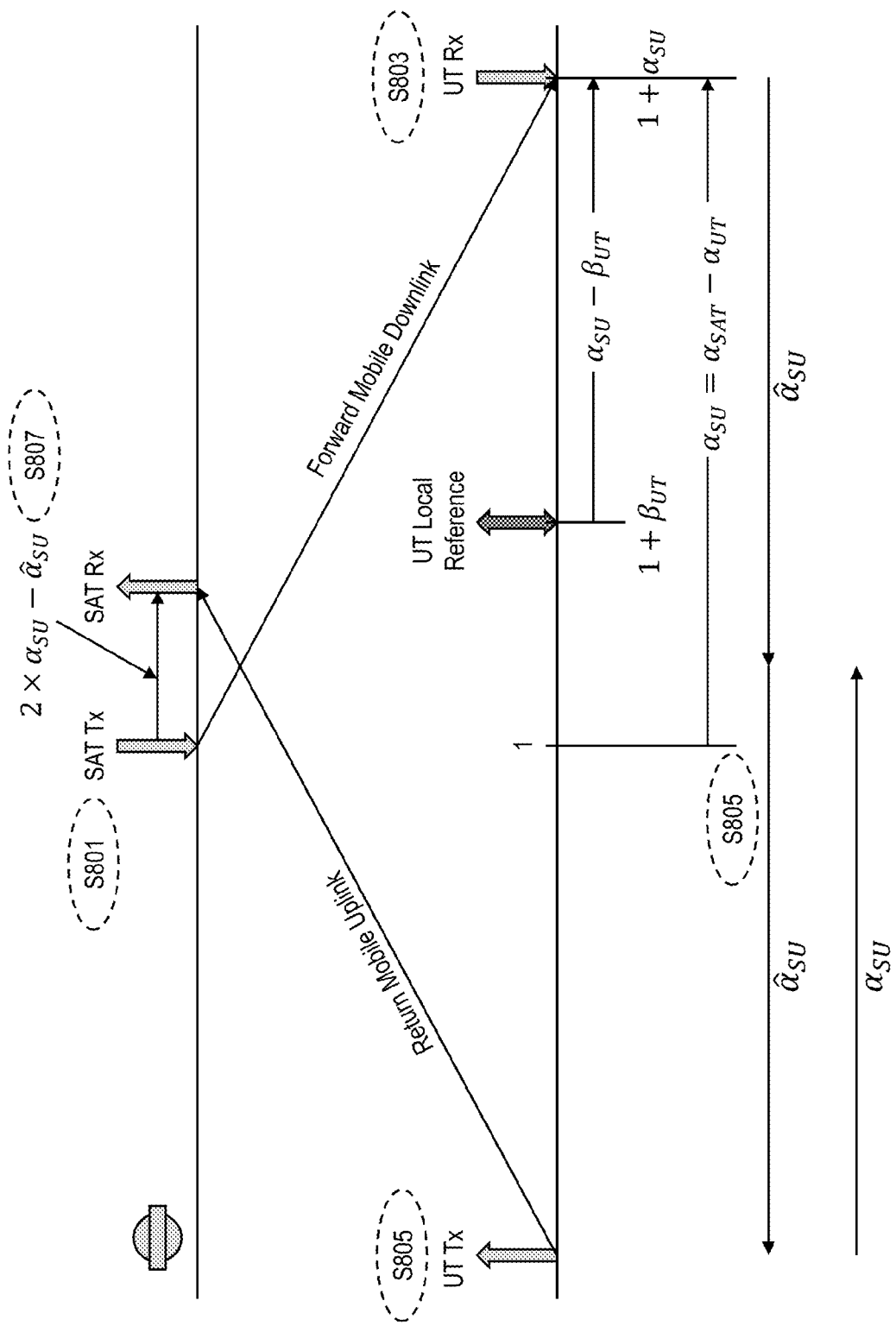
FIG. 8B Illustrates a diagram depicting end-to-end frequency synchronization for Time Division Multiple Access (TDMA)/Frequency Division Multiple Access (FDMA) systems, in accordance with example embodiments of the present invention.

FIG. 8A Illustrates a diagram depicting the end-to-end frame timing synchronization for Time Division Multiple Access (TDMA)/Frequency Division Multiple Access (FDMA) systems, in accordance with example embodiments of the present invention. FIG. 8B Illustrates a diagram depicting the end-to-end frequency synchronization for Time Division Multiple Access (TDMA)/Frequency Division Multiple Access (FDMA) systems, in accordance with example embodiments of the present invention. As described earlier, the UT in the TDMA/FDMA system (i)

estimates the system reference from the downlink reception by removing the downlink delay and Doppler offsets, and (ii) pre-compensates this estimated system reference for the return uplink delay and Doppler offsets of the target (primary) return link LEO satellite. With reference to FIG. 8B, Step 1 (S801) is the same as performed by the UT in a CDMA system. The satellite transmission occurs at the nominal system reference. Step 2 (S803) is performed only by the UTs in a TDMA/FDMA system. The UT receives the downlink signal after it experiences the mobile link Doppler. For both these steps, the UT uses the knowledge of the LEO satellite ephemeris and the knowledge of its own position and velocity vectors. At Step 3 (S805), the UT introduces an offset of twice the estimated downlink Doppler in its transmit relative to the receive. At Step four (S807), the UT transmits signals received at the satellite with twice the one-way error in the UT estimation of the downlink Doppler. At initial access, the errors limited to mobile link Doppler variation over the spot beam (e.g., <±[90]Hz). In the connected mode, the error is limited to the closed loop threshold at the RAN (e.g., ~±[20]Hz). In a case of multi-satellite diversity, the diagrams of FIG. 8 depict the context of the primary satellite. For secondary satellite(s) involved in the diversity reception over the return link, an additional guard interval, not shown in the figures, would be reserved to prevent adjacent channel interference or adjacent frame interference when multiple UTs are multiplexed over a common frequency band or a common TDMA frame.

Figure 9:
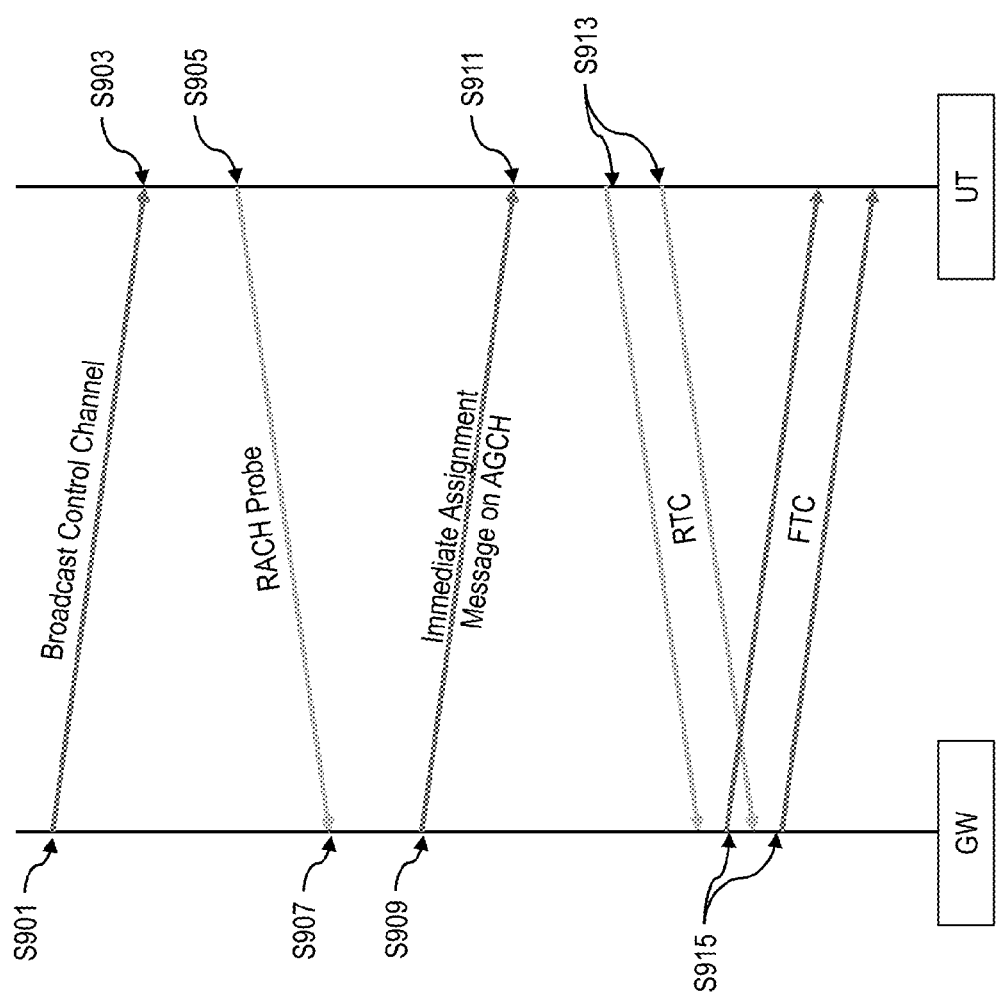
FIG. 9 Illustrates a synchronization operation within a mobile satellite system, in accordance with example embodiments of the present invention.

Network-Level Synchronization:

In accordance with example embodiments of the present invention, the network level synchronization process operates within the framework of a mobile satellite system, which is designed to have the broadcast control channels (BCCH) on the forward link, the random access channels (RACH) on the return link, and the dedicated control channels on both the forward and return links. FIG. 9 illustrates a synchronization operation within a mobile satellite system, in accordance with example embodiments of the present invention. According to one embodiment, with reference to FIG. 9, the synchronization process for such a system is provided. First, the GW broadcasts, on the control channel, current and future ephemeris information of each satellite (S901), where the ephemeris information for a particular satellite is broadcast via that satellite via that satellite. In addition, the ephemeris information for this satellite is also conveyed via the other satellites. Depending on the number of satellites in the constellation, the GWs may transmit ephemeris of all satellites that cover a geographic region in the next several hours. Next, the UT acquires the forward link control channel and reads the broadcast ephemeris information (S903). Due to availability of the ephemeris information of multiple satellites on a broadcast control channel of a particular satellite, the UT is made aware of all the upcoming satellites ahead of time. This allows the UT to synchronize to the network in a quick and efficient manner in the idle mode and initiate the random access ALOHA procedure in a time and frequency synchronized manner. The UT then initiates a connection by transmitting a random access channel (RACH) probe (S905) (e.g., an ALOHA burst on the return link RACH), and the GW then acquires the RACH probe from the UT (S907) and measures the received signal timing and frequency offsets. On successful reception of the RACH probe, the GW sends the immediate assignment (IA) message to the UT (S909) on an access grant channel (AGCH), which may optionally contain a timing and frequency correction (TFC) field derived based on the measured offsets in step S905. The UT receives the AGCH message (S911). The UT then initiates return traffic channel (RTC) transmission (S913) based on the information contained in the IA message received over the AGCH, and the GW initiates the RTC receiver using the timing and frequency offsets measured on the RACH probe. The GW then initiates forward traffic channel (FTC) transmission (S915).

Further, the processes of the example embodiments may be used by the UT to track the system timing and frequency, in the idle as well as in the connected modes. These processes require an accurate knowledge at the UT of the satellite ephemeris, and its position and velocity vectors. According to one embodiment, the UT air-interface requirements for updating the UT knowledge of the satellite ephemeris, and its position and velocity vectors is provided. By way of example, satellite ephemeris information updates are performed in the idle mode and in the connected mode of the UT. In the idle mode, the UT reads the broadcast control channel (BCCH) ephemeris data each time the service information (SI) segments carrying the ephemeris information change. In the connected mode, the UT should have the latest version of the BCCH ephemeris data prior to entering the connected mode, but the UT is not required to read the BCCH ephemeris information while it is in the connected mode. By way of further example, UT position information updates are also performed in the idle mode and in the connected mode. In the idle mode the UT updates its GPS position whenever the GPS position outage time conveyed over the BCCH expires. In the connected mode (i) a UT that can estimate its position while in the connected mode (including the aeronautical terminals) performs the GPS position determination periodically (depending on the connected mode GPS position outage parameter conveyed over the BCCH), and (ii) a UT that cannot estimate its position (while in the connected mode) reports transmit-receive offset (TRO), for both time and frequency domains, to the GW—the GW periodically estimates the UT position using the received time and frequency offsets of the UT transmission on the return link and the reported TRO—the GW subsequently communicates the estimate of the UT position to the UT if it changes by greater than a distance threshold—in such an event, the UT uses the updated position estimate received from the GW.

Figure 10A:
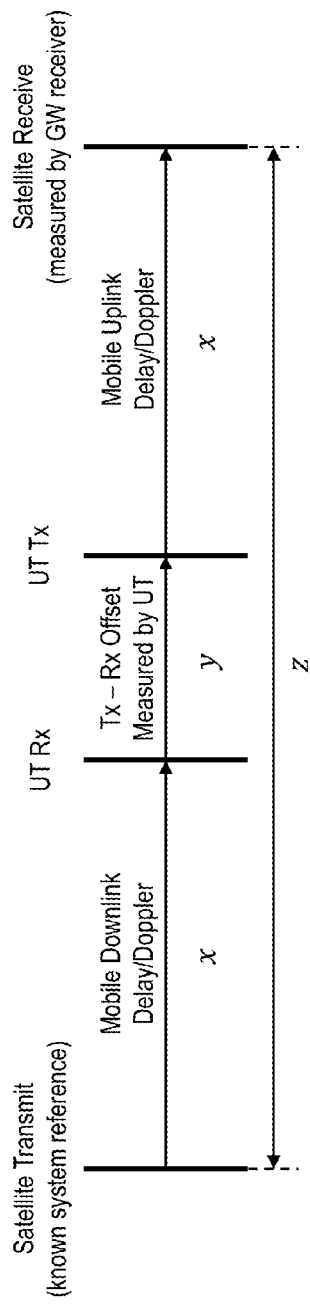
FIG. 10A illustrates a timing diagram depicting user terminal (UT) position ambiguity removal by UTs reporting transmit to receive (Tx-Rx) offset to the gateway (GW), in accordance with example embodiments of the present invention.
Figure 10B:
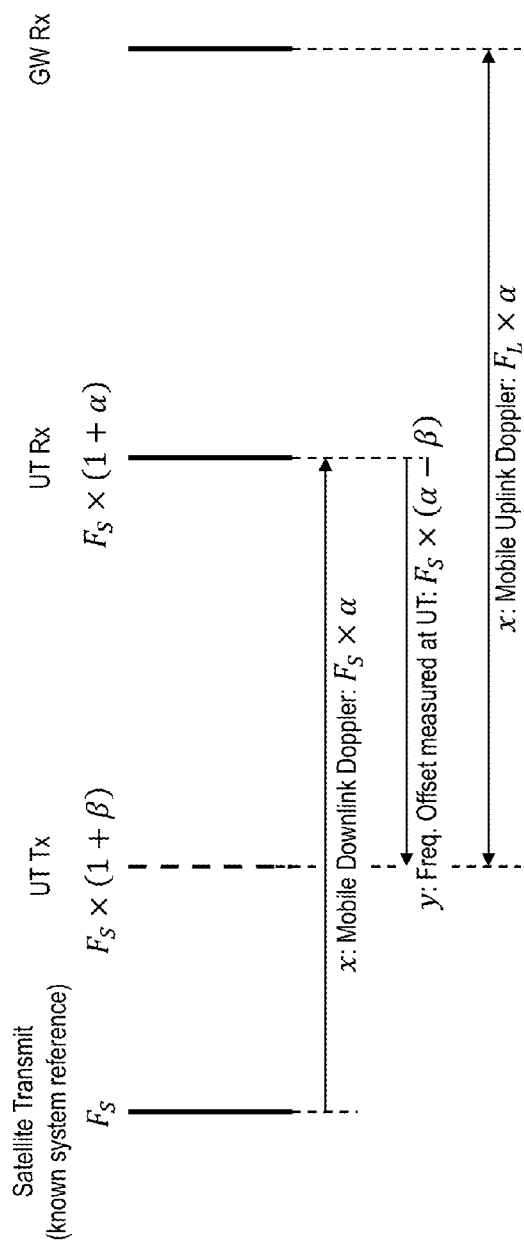
FIG. 10B illustrates a frequency diagram depicting user terminal (UT) position ambiguity removal by UTs reporting transmit to receive (Tx-Rx) offset to the gateway (GW), in accordance with example embodiments of the present invention.

FIG. 10A illustrates a timing diagram depicting user terminal (UT) position ambiguity removal by UTs reporting transmit to receive (Tx-Rx) offset to the gateway (GW), in accordance with example embodiments of the present invention. FIG. 10B illustrates a frequency diagram depicting user terminal (UT) position ambiguity removal by UTs reporting transmit to receive (Tx-Rx) offset to the gateway (GW), in accordance with example embodiments of the present invention. Certain benefits of the process of TRO reporting by the UT are illustrated in FIG. 10. For example, the GW measures (either in time or in frequency) an offset (relative to the system reference) of $z=2x+y$, whereas the UT measures the offset y and reports that as the TRO to GW. Given z and y, the GW can therefore unambiguously determine x (e.g., the timing and frequency offsets on the UT to the LEO satellite mobilelink), which are fed to a UT position determination algorithm operating at the GW. Without the knowledge of the TRO y at the GW, (e.g., if the GW were to use z/2 in place of x in the UT position determination algorithm) the estimated UT position will have an error due to UT oscillator errors.

Synchronization with on-Board Processing Satellites:

The synchronization processes of the example embodiments specified above are for general communications network architectures utilizing bent-pipe satellites, wherein the receiver processing is performed at the UT and GW in forward and return links. These processes, however, can also be applied to a communications network architecture that utilizes an on-board processing satellite. According to example embodiments, in such a processing satellite architecture, the return link receiver function of the GW is performed by an on-board satellite processor. With regard to feederlink synchronization, however, unlike the GW receiver, the satellite on-board processor is not burdened with the handling of the feederlink synchronization process. In the forward link, the GW performs the feederlink synchronization (as described above), and thus the satellite on-board the processor is not burdened with either the feederlink or mobilelink synchronization processes. This processing satellite approach thereby significantly reduces the synchronization process complexity for the on-board processor, thereby facilitating smaller, lighter and less expensive satellites.

In the preceding specification, various embodiments have been described with reference to the accompanying drawings. It will, however, be evident that various modifications may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method for gateway synchronization in a satellite communications system, the method comprising:
   receiving ephemeris data from a one of one or more satellites of the satellite communications system;
   determining a system timing reference and a system frequency reference based on a global positioning system (GPS) reference signal;
   periodically determining a timing delay factor and a frequency factor for the one satellite based on the received ephemeris data;
   dynamically adjusting the system timing reference based on the timing delay factor, and dynamically adjusting the system frequency reference based on the frequency factor, for synchronization of a data transmission from a gateway of the satellite communications system to the one satellite, at a respective point in time, via a communications link from the gateway to the one satellite; and
   synchronizing a timing and a frequency for the data transmission to the one satellite based on the respective adjusted system timing reference and the respective adjusted system frequency reference.

2. The method according to claim 1, wherein the received ephemeris data reflects velocity and direction vector motion of the one satellite.

3. The method according to claim 1, wherein the periodic determination of the timing delay factor and the frequency Doppler factor for each of the satellite(s) to which the transmissions occur is performed on one of a frame-by-frame basis and a slot-by-slot basis.

4. The method according to claim 1, wherein the timing delay factor reflects a link delay for the data transmission over the communications link from the gateway to the one satellite, a transponder delay based on a processing time of a transponder of the one satellite via which the data transmission is to be received, and a gateway hardware delay based on a transmission processing time of the gateway.

5. The method according to claim 4, wherein the timing for the data transmission to the one satellite is synchronized for a respective frame transmission time determined as a frame marker time minus the timing delay factor, wherein the frame marker time reflects a target point in time for receipt of the data transmission at the transponder of the one satellite.

6. The method according to claim 4, wherein the timing for the data transmission to the one satellite is synchronized for a respective frame transmission time $T_{GW-TX}(t)$ determined as $$T_{GW-TX}(t)=T_{GPS-REF}-d_{GS}^{FWD}(t)-d_{C-S}-d_{HW},$$

where $T_{GPS-REF}$ is a frame time marker that reflects a target point in time for receipt of the data transmission at the transponder of the one satellite, $d_{GS}^{FWD}(t)$ is the link delay, $d_{C-S}$ is the transponder delay and $d_{HW}$ is the gateway hardware delay.

7. The method according to claim 1, wherein the frequency factor reflects an instantaneous value for gateway to satellite Doppler shift for the data transmission from the gateway to the one satellite.

8. The method according to claim 1, wherein the frequency for the data transmission to the one satellite is synchronized for a transmission frequency determined based on a system reference frequency at which the data transmission is to be received by a transponder of the one satellite, a drift value for a reference oscillator of the one satellite, and a fractional Doppler shift of the communications link from the gateway to the one satellite.

9. The method according to claim 8, wherein the transmission frequency $F_{GW-TX}(t)$ is determined as $$F_{GW-TX}(t)=(F_S+F_{C-S}\times(1+\beta_{sat}(t)))/(1+\alpha_{GS}^{FWD}(t)),$$

where $F_S$ is the system-reference frequency at which the data transmission is to be received by the transponder of the one satellite, $\beta_{sat}(t)$ is the drift value for the reference oscillator of the one satellite, $\alpha_{GS}^{FWD}(t)$ is the fractional Doppler shift of the communications link from the gateway to the one satellite, and $F_{C-S}$ is a link frequency conversion factor.

10. A gateway for a satellite communications system, comprising:
   a receiver configured to receive ephemeris data from a one of one or more satellites of the satellite communications system;
   a processor configured to
   (i) determine a system timing reference and a system frequency reference based on a global positioning system (GPS) reference signal,
   (ii) periodically determine a timing delay factor and a frequency factor for the one satellite based on the received ephemeris data,
   (iii) dynamically adjust the system timing reference based on the timing delay factor, and dynamically adjust the system frequency reference based on the frequency factor, for synchronization of a data transmission from the gateway to the one satellite, at a respective point in time, via a communications link from the gateway to the one satellite, and
   (iv) synchronize a timing and a frequency for the data transmission to the one satellite based on the respective adjusted system timing reference and the respective adjusted system frequency reference.

11. The gateway according to claim 10, wherein the received ephemeris data reflects velocity and direction vector motion of the one satellite.

12. The gateway according to claim 10, wherein the periodic determination of the timing delay factor and the frequency Doppler factor for each of the satellite(s) to which the transmissions occur is performed on one of a frame-by-frame basis and a slot-by-slot basis.

13. The gateway according to claim 10, wherein the timing delay factor reflects a link delay for the data transmission over the communications link from the gateway to the one satellite, a transponder delay based on a processing time of a transponder of the one satellite via which the data transmission is to be received, and a gateway hardware delay based on a transmission processing time of the gateway.

14. The gateway according to claim 13, wherein the timing for the data transmission to the one satellite is synchronized for a respective frame transmission time determined as a frame marker time minus the timing delay factor, wherein the frame marker reflects a target point in time for receipt of the data transmission at the transponder of the one satellite.

15. The gateway according to claim 13, wherein the timing for the data transmission to the one satellite is synchronized for a respective frame transmission time $T_{GW-TX}(t)$ determined as $$T_{GW-TX}(t) = T_{GPS-REF} - d_{GS}^{FWD}(t) - d_{C-S} - d_{HW},$$

where $T_{GPS-REF}$ is a frame time marker that reflects a target point in time for receipt of the data transmission at the transponder of the one satellite, $d_{GS}^{FWD}(t)$ is the link delay, $d_{C-S}$ is the transponder delay and $d_{HW}$ is the gateway hardware delay.

16. The gateway according to claim 10, wherein the frequency factor reflects an instantaneous value for gateway to satellite Doppler shift for the data transmission from the gateway to the one satellite.

17. The gateway according to claim 10, wherein the frequency for the data transmission to the one satellite is synchronized for a transmission frequency determined based on a system reference frequency at which the data transmission is to be received by a transponder of the one satellite, a drift value for a reference oscillator of the one satellite, and a fractional Doppler shift of the communications link from the gateway to the one satellite.

18. The gateway according to claim 17, wherein the transmission frequency $F_{GW-TX}(t)$ is determined as $$F_{GW-TX}(t) = (F_S + F_{C-S} \times (1 + \beta_{sat}(t)))/(1 + \alpha_{GS}^{FWD}(t)),$$

where $F_S$ is the system-reference frequency at which the data transmission is to be received by the transponder of the one satellite, $\beta_{sat}(t)$ is the drift value for the reference oscillator of the one satellite, $\alpha_{GS}^{FWD}(t)$ is the fractional Doppler shift of the communications link from the gateway to the one satellite, and $F_{C-S}$ is a link frequency conversion factor.

* * * * *